United States Patent
Gunbatar et al.

(10) Patent No.: US 10,512,204 B1
(45) Date of Patent: Dec. 24, 2019

(54) HEADING MEASUREMENT COMPENSATION FOR GNSS NAVIGATION

(71) Applicant: Ag Leader Technology, Inc., Ames, IA (US)

(72) Inventors: Yakup Gunbatar, Ames, IA (US); Michael Schneider, Ames, IA (US)

(73) Assignee: AG LEADER TECHNOLOGY, INC., Ames, IA (US)

(*) Notice: Subject to any disclaimer, the term of this patent is extended or adjusted under 35 U.S.C. 154(b) by 30 days.

(21) Appl. No.: 15/656,515

(22) Filed: Jul. 21, 2017

Related U.S. Application Data

(60) Provisional application No. 62/365,732, filed on Jul. 22, 2016.

(51) Int. Cl.
| | |
|---|---|
| *G01S 19/03* | (2010.01) |
| *A01B 69/00* | (2006.01) |
| *G01C 21/16* | (2006.01) |
| *G01S 19/47* | (2010.01) |
| *G01S 19/52* | (2010.01) |
| *G01S 19/26* | (2010.01) |
| *G01S 19/07* | (2010.01) |
| *G01S 19/40* | (2010.01) |
| *G01S 19/41* | (2010.01) |
| *G01S 19/14* | (2010.01) |

(52) U.S. Cl.
CPC ............ *A01B 69/004* (2013.01); *A01B 69/00* (2013.01); *G01C 21/165* (2013.01); *G01S 19/07* (2013.01); *G01S 19/26* (2013.01); *G01S 19/40* (2013.01); *G01S 19/41* (2013.01); *G01S 19/47* (2013.01); *G01S 19/52* (2013.01); *G01S 19/03* (2013.01); *G01S 19/14* (2013.01)

(58) Field of Classification Search
CPC .......... G01S 19/40; G01S 19/41; G01S 19/14; G01S 19/23; A01B 69/00; A01B 69/006; A01B 69/007
USPC ............. 701/23, 26, 41, 50, 408, 32.3–32.4; 342/357.39
See application file for complete search history.

(56) References Cited

U.S. PATENT DOCUMENTS

| | | |
|---|---|---|
| 4,103,561 A | 8/1978 | Baker |
| 4,756,543 A | 7/1988 | Cromnow et al. |
| 7,124,579 B1 | 10/2006 | Gehlhoff |
| 7,142,956 B2 | 11/2006 | Heiniger et al. |
| 7,225,060 B2 | 5/2007 | O'Connor et al. |
| 7,715,964 B1 * | 5/2010 | Connally ............... B62D 1/28 180/446 |

(Continued)

OTHER PUBLICATIONS

Heading and attitude determination system with low-cost IMU embedded inside one of multiple antennas; Nikolay Vasilyuk et al.; 2018 IEEE/ION Position, Location and Navigation Symposium (PLANS); pp. 267-274; IEEE Conferences.*

Using satellite receivers with a common clock in a small-sized GNSS compass; G. I. Emel'yantsev et al.; 2017 24th Saint Petersburg International Conference on Integrated Navigation Systems (ICINS); Year: 2017; pp. 1-2 IEEE Conferences.*

(Continued)

*Primary Examiner* — Cuong H Nguyen
(74) *Attorney, Agent, or Firm* — Goodhue, Coleman & Owens, P.C.

(57) ABSTRACT

A method, apparatus, or system of estimating vehicle heading taking GNSS antenna movement and/or mounting position into account. Measurements from the GNSS can be used to estimate GNSS antenna yaw or misalignment relative a pivot or control point, or vehicle fixed-body origin. Side-slip is either ignored or, if known, can be used to adjust the estimation of vehicle heading.

33 Claims, 7 Drawing Sheets

(56) References Cited

U.S. PATENT DOCUMENTS

| | | | | |
|---|---|---|---|---|
| 8,447,440 B2* | 5/2013 | Phillips | G05D 1/0088 | 701/2 |
| 8,594,879 B2* | 11/2013 | Roberge | A01B 69/007 | 701/23 |
| 8,639,416 B2* | 1/2014 | Jones | A01B 69/007 | 342/357.22 |
| 8,649,930 B2* | 2/2014 | Reeve | A01B 69/008 | 701/23 |
| 9,002,565 B2* | 4/2015 | Jones | E02F 9/2045 | 701/23 |
| 2009/0319186 A1* | 12/2009 | Kumar | G05D 1/027 | 701/472 |
| 2013/0162479 A1* | 6/2013 | Kelly | G01S 1/042 | 342/385 |
| 2014/0277954 A1* | 9/2014 | Nelson, Jr. | A01C 21/00 | 701/50 |
| 2014/0324291 A1* | 10/2014 | Jones | E02F 9/2045 | 701/41 |
| 2015/0112557 A1* | 4/2015 | Nelson, Jr. | A01C 21/00 | 701/50 |
| 2016/0252909 A1* | 9/2016 | Webber | E02F 9/2045 | 701/41 |

OTHER PUBLICATIONS

Dual-mode GNSS gyrocompass using primary satellite measurements; G. I. Emel'yantsev et al.; 2018 25th Saint Petersburg International Conference on Integrated Navigation Systems (ICINS); Year: 2018; pp. 1-3; IEEE Conferences.*

Electrically integrated miniature motion tracking module with multiple external GNSS receiver support; M. Crabolu et al.; 2018 DGON Inertial Sensors and Systems (ISS); Year: 2018; pp. 1-13; IEEE Conferences.*

Improving detection of incorrect GPS carrier phase integer ambiguity solutions with the Ambiguity Filter; Rita Pereira et al.; 2016 International Conference on Localization and GNSS (ICL-GNSS); Year: 2016; pp. 1-6; IEEE Conferences.*

Collaborative Vehicle Self-Localization Using Multi-GNSS Receivers and V2V/V2I Communications; Luís Conde et al.; 2015 IEEE 18th International Conference on Intelligent Transportation Systems; Year: 2015; pp. 2525-2532; IEEE Conferences.*

Bevly, David M. and Stewart Cobb. GNSS for vehicle control. Artech House, Boston and London, GNSS Technology and Applications Series; ISBN 13: 978-1-59693-301-9, pp. 120-130. 2010.

* cited by examiner

FLOW CHART 1

HEADING MEASUREMENT COMPENSATION FOR GNSS NAVIGATION

CROSS-REFERENCE TO RELATED APPLICATIONS

This application claims the benefit of Provisional Application U.S. Ser. No. 62/365,732 filed on Jul. 22, 2016, all of which is herein incorporated by reference in its entirety.

I. BACKGROUND OF THE INVENTION

A. Field of the Invention

The present invention relates to navigation systems and, in particular, to promoting improved navigation solution accuracy in GNSS/INS navigation systems by taking into account GNSS antenna movement during vehicle movement and/or mounting position relative a vehicle body-fixed frame. The invention can be implemented, for example, with guidance and control systems for automatically steered vehicles, including but not limited to agricultural vehicles.

B. Problems in the Art

A GNSS-aided inertial navigation system for a farming vehicle normally requires an accurate heading measurement. Most such systems use a measurement of vehicle travel direction determined from two GNSS position measurements as the heading measurement. Given an X-Y coordinate system, the travel direction can be calculated as the signed arctangent of the Y direction change and the X direction change. If side slip is negligible, the travel direction is assumed to be aligned with the vehicle heading when moving forward, and aligned 180 degrees from vehicle heading when moving backward. A problem with this method is that at any instant, the direction of travel of the GNSS antenna may be very different from the travel direction of the vehicle due to the mounting location of the GNSS antenna and the roll, pitch, and yaw motions of the vehicle. These motions introduce error into the vehicle heading measurement.

GNSS accuracy, including differential GNSS techniques, is used beneficially in a variety of guidance systems. One form uses position (xyz), velocity (xyz), and heading angle of the GNSS antenna from measurements of the GNSS. However, these measurements apply to the GNSS antenna position, not necessarily the most relevant point of the vehicle. For example, in agricultural applications, the control point of the vehicle is of most interest.

Vehicle heading cannot be measured directly with a single GNSS antenna as the GNSS antenna provides travel direction of the vehicle. So, a common solution is to use the travel direction of the GNSS antenna as a measurement of vehicle heading by placing the antenna at the top of the pivot point of the vehicle, e.g., top of rear axle for front wheel steered vehicles.

This can be a particular problem when the vehicle encounters uneven terrain or other conditions which can cause significant movement of the GNSS antenna which do not represent vehicle heading. Besides, it is not always possible to locate a GNSS antenna at the top of the pivot point.

A need has been identified in this technical field for improvement.

As stated above, A GPS aided inertial navigation system for a farming vehicle normally requires an accurate vehicle heading measurement. Most such systems use a measurement of vehicle heading determined from two GNSS position measurements. This is not true for a single unit GNSS antenna though (Reference: Bevly, David M., and Stewart Cobb. *GNSS for vehicle control*. Artech House, Boston and London, 2010, GNSS Technology and Applications Series; ISBN 13: 978-1-59693-301-9; pp. 120-130, incorporated by reference herein). The major disadvantage of using two GNSS receivers in the GNSS/INS system is the cost. Thus, the interest in industry is to get good accuracy in navigation solution and control by using a single GNSS antenna. With a single GNSS antenna and without using GNSS heading measurement, when the GNSS unit is exercised sufficiently during vehicle operations, the system is observable (estimation of the positions, velocities, and orientation angles are possible), and accurate estimation is available. Nonetheless, sufficient movement of the GNSS antenna for full observability is not guaranteed. Straight (AB) line path tracking for a farming machine is very common and this is often when the sufficient GPS exercise and consequently the full observability is lost. Therefore, it is needed to have a heading measurement, in addition to position and velocity measurements, from the GNSS unit. As GNSS heading measurement is calculated from GNSS antenna's direction vector, it is nothing but ground track heading, i.e. course, of the GNSS antenna. A problem with this method is that at any instant, the direction of travel of the GNSS antenna may be very different from the vehicle heading, e.g. the angle between the navigation frame and the nose of the vehicle, due to the mounting location of the GNSS antenna and the roll, pitch, and yaw motions of the vehicle. These motions introduce error into the vehicle heading measurement provided by the GNSS antenna. Therefore, when the discrepancy between the vehicle heading and the GNSS heading measurement is not modeled, the estimation accuracy, particularly the vehicle heading estimation, which is crucial in path following for agricultural machines, degrades.

In certain aspects of this work, we use the condition that in the presence of zero (or negligibly small) side-slip at the pivot point of the vehicle, the course of the pivot point aligns with the vehicle heading. As this assumption applies to most of the operating conditions for agricultural machines, it is employed to model the difference between single GNSS heading measurement and the vehicle heading in estimation design to achieve significantly more accurate and smooth navigation solution.

II. SUMMARY OF THE INVENTION

A. Objects, Features, Aspects, and Advantages

It is therefore a principle object, feature, aspect, or advantage of the present invention to provide methods, apparatus, and systems which improve over or solve problems and deficiencies in the state of the art.

Further objects, features, aspects, and advantages of the invention include methods, apparatus, or systems that include at least one or more of the following:
a. It reduces the susceptibility of the estimation to GNSS antenna mounting location and to terrain conditions (change in terrain can cause the GNSS antenna to move due to angular rates and yield error in heading measurement).
b. Flexibility of GNSS antenna placement on vehicles.
c. Reduction of estimation error due to uneven terrain and other challenging conditions.
d. More accurate and precise estimations.

e. Promotes better and more stable control performance of automatic steering of agricultural machines.
f. Significantly improved estimation of the vehicle position, velocity, and angular rate via single GNSS receiver signals. Uses existing measurements available from GNSS.
g. Low cost system with respect to the systems employing two GNSS receivers.
h. Does not add significant computational overhead.

B. Aspects of the Invention

This invention corrects for the error in the GNSS based heading measurement by correcting for the difference between the travel direction of the GNSS antenna and the heading of the vehicle. The equations refer to this correction primarily as BetaGNSS.

Via this method, flexibility of GNSS antenna placement or mounting position is provided. GNSS antenna placement is not limited to a specific area of the vehicle. Predicting GNSS motion reduces error in estimation due to rolling terrains remarkably. Improved estimation is attained in challenging conditions. More accurate estimation yields better and more stable control performance.

It reduces the susceptibility of the estimation to GNSS antenna mounting location and to terrain conditions (change in terrain can cause GNSS antenna to move due to angular rates and yield error in heading measurement).

This invention (method) models and estimates the difference between the GNSS heading measurement and the vehicle heading and employs it in estimator design to improve the estimation significantly. The equations refer to this correction as BetaGPS or BetaGNSS.

In one aspect of the invention, a vehicle includes a navigation system with a GNSS antenna and a computerized estimator including a digital estimator, such as a Kalman filter. The estimator periodically produces a vehicle heading estimate and typically uses that estimate to predict vehicle heading measurements. Those predicted heading measurements are used to produce a navigation solution that is useful, for example, in automated steering of the vehicle. In this aspect of the invention, the typical heading prediction is modified by including a value called BetaGNSS. BetaGNSS is the angular difference between the velocity at the GNSS antenna and the velocity at the vehicle pivot point, where side slip of the vehicle at the pivot point is ignored or considered negligible. This compensates for antenna movement or antenna mounting position on the vehicle.

In another aspect of the invention, BetaGNSS (yaw difference) is the angle between the travel direction of the GNSS antenna and the travel direction of the pivot point of the vehicle. In other words, BetaGNSS is the angular direction of the velocity at the GNSS antenna with respect to a coordinate system aligned with the velocity at the vehicle pivot point. BetaGNSS is either obtained by using the travel directions (velocity vectors) of the pivot point and the GNSS antenna in the body-fixed frame or in the navigation frame. Any yaw orientation error between the GNSS antenna travel direction and the pivot point travel direction is feedback to an estimator to estimate vehicle heading in addition to positions, velocities, and attitude of the vehicle, regardless of placement of the GNSS antenna. In one embodiment, side slip of the vehicle is considered negligible. In another embodiment, if side slip of the vehicle is not considered negligible and is known, a GNSS side-slip angle estimation is used to modify the heading estimation also. Further details of this aspect are set forth below at Exemplary Embodiments 2 and 3.

In another aspect of the invention, implementations of the invention with a digital filter (GNSS/INS system) are provided in flowcharts (see FIG. 6 and FIG. 7). Further details of this aspect are set forth below at Exemplary Embodiments 2 and 3 (FLOW CHARTS 1 and 2). The first implementation uses the direction of the velocities of the pivot point and the GNSS antenna defined in the navigation frame, while the second uses the direction of the velocities of the pivot point and the GNSS antenna defined in the body-fixed frame.

In another aspect, an apparatus comprises an integrated GNSS/INS navigation system which can be programmed to output a compensated vehicle heading estimate in its navigation solution based on any of the foregoing embodiments.

In another aspect, a system uses the compensated navigation solution to inform a guidance system to instruct a control system for automated steering of the vehicle.

In one aspect, available in Embodiment 1, the problem and the challenge in state estimation in a GPS/INS or GNSS/INS integrated system with a single GPS or GNSS receiver is explained. Then, apart from the development of the method, the mathematical derivation of the development of the method is provided. The representative velocity vectors for the method, at pivot point, at GPS receiver, and at control point are illustrated on a front wheel steered vehicle. Moreover, the angles used in the method are illustrated in the figures. At the end of the embodiment, the formula and the brief explanation of the implementation of the method are provided. Even though the angles are represented in the Navigation and the Body-fixed frames, their representations can be obtained at any selected reference frames, i.e., their representations are not limited to the defined and used reference frames. Furthermore, it is to be understood that aspects of any of the aspects and embodiments according to the invention can be applied in analogous ways to other ground vehicles, including but not limited to an articulated vehicle.

This invention produces a more accurate heading measurement. The improved accuracy of the heading measurement will improve the accuracy of the navigation system and improve steering control.

III. BRIEF DESCRIPTION OF THE DRAWINGS

The Figures illustrate concepts and features according to aspects of the invention and are summarized below:

FIG. 1 is a top view annotated diagram of a front wheel steered, where the Body-fixed frame is placed at the rear axle. The Navigation frame is also illustrated. The vehicle is on the xy plane of the Navigation frame. The representative velocities and angles related to the method are also illustrated in the figure.

FIGS. 2-4 are graphs, including the close views, illustrating the results when these aspects of the invention are implemented and tested.

Figure 1:
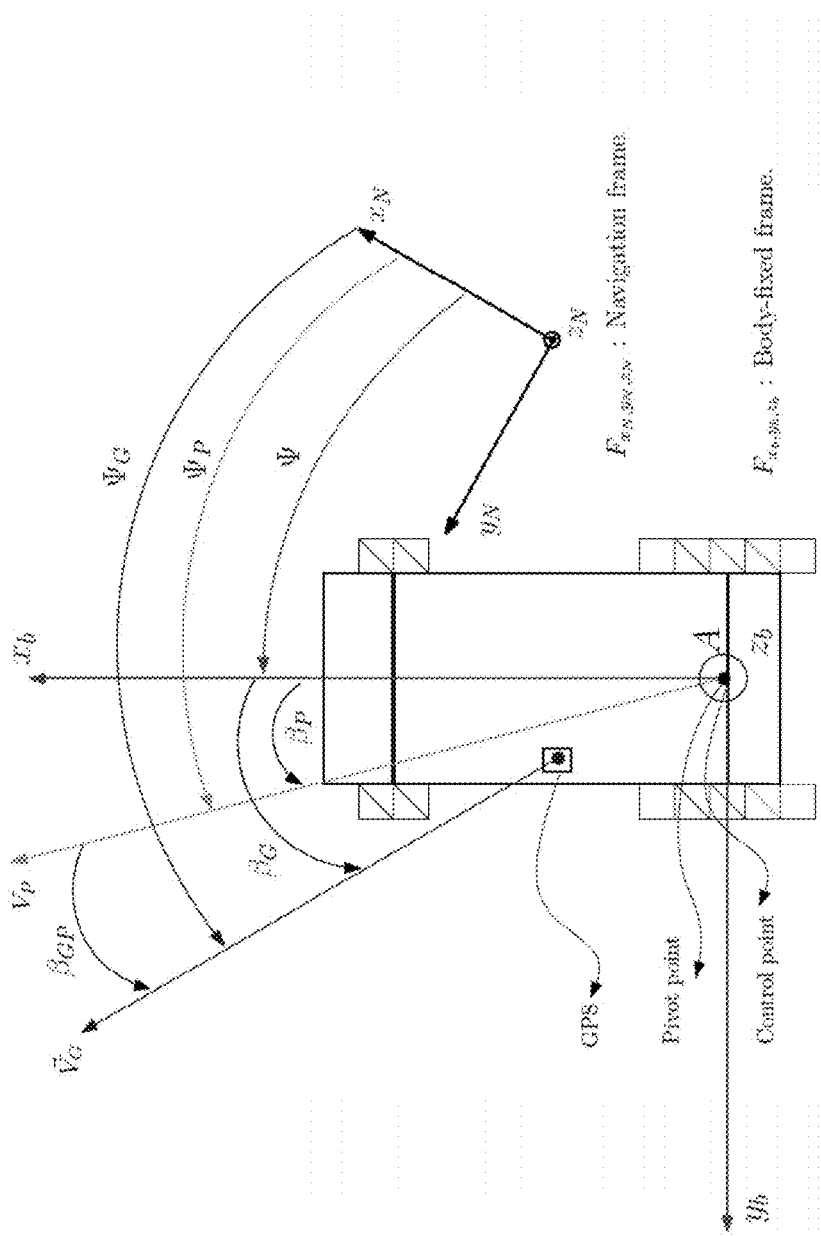
Figure 5:
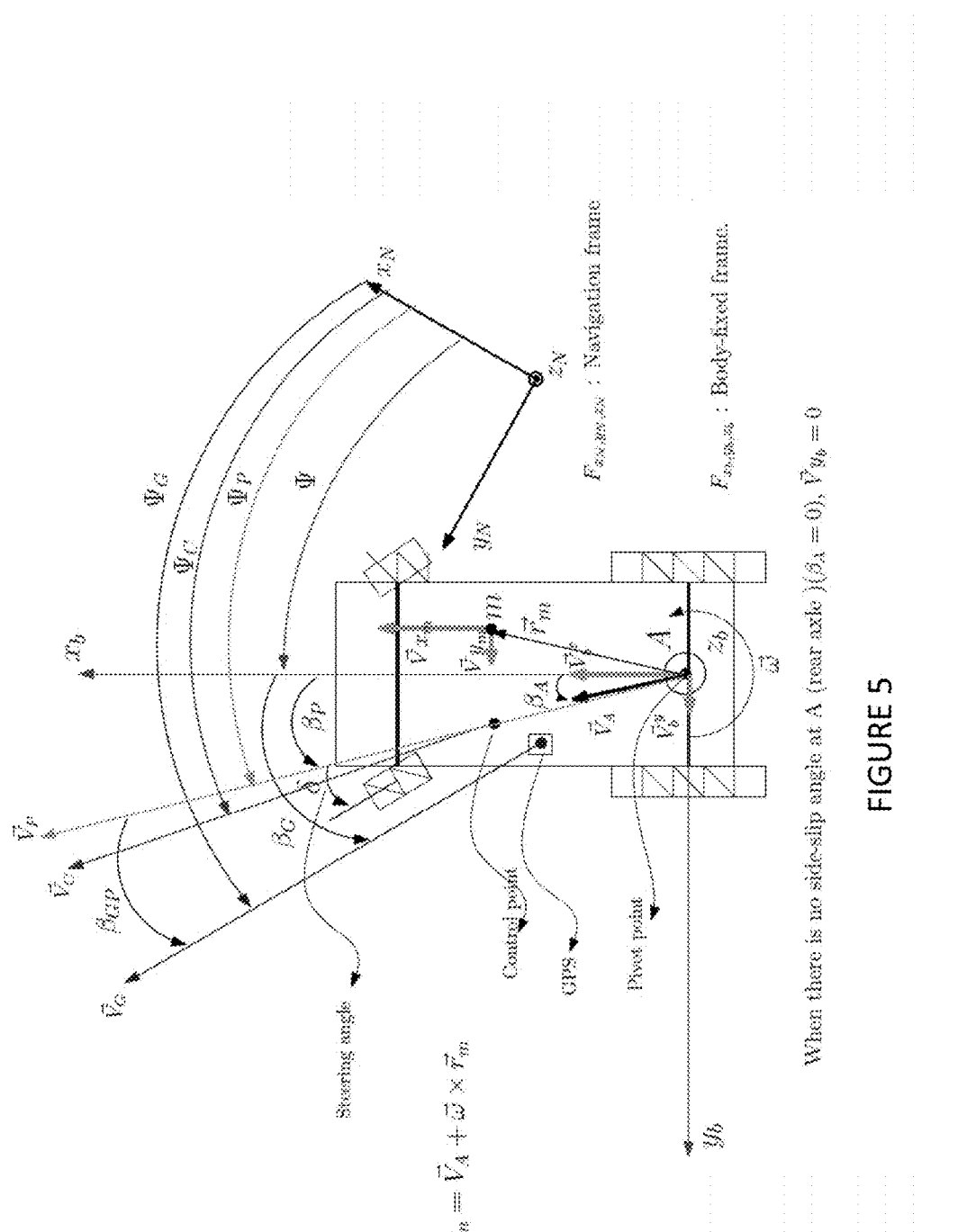

FIG. 5 is similar to FIG. 1. It also shows the vehicle in turning condition. In this figure, a possible angle due to side-slip at the rear axle is also illustrated. Differently from FIG. 1, FIG. 5 also shows a control point placed not on the pivot point.

Figure 6:
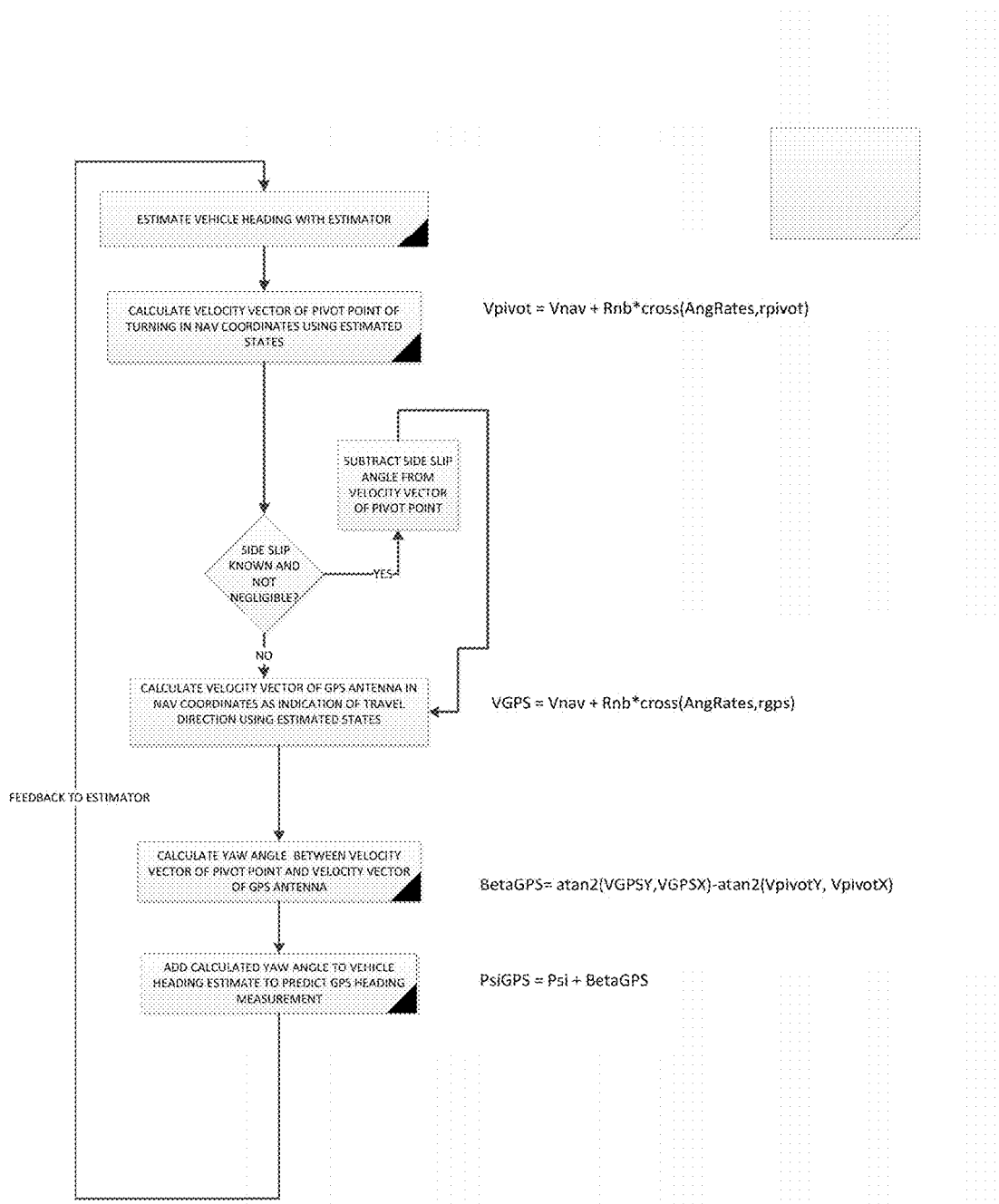

FIG. 6 (Flow Chart 1) is a flow chart of a method of calculating BetaGNSS according to a Second Exemplary Embodiment of the Invention, further described below.

Figure 7:
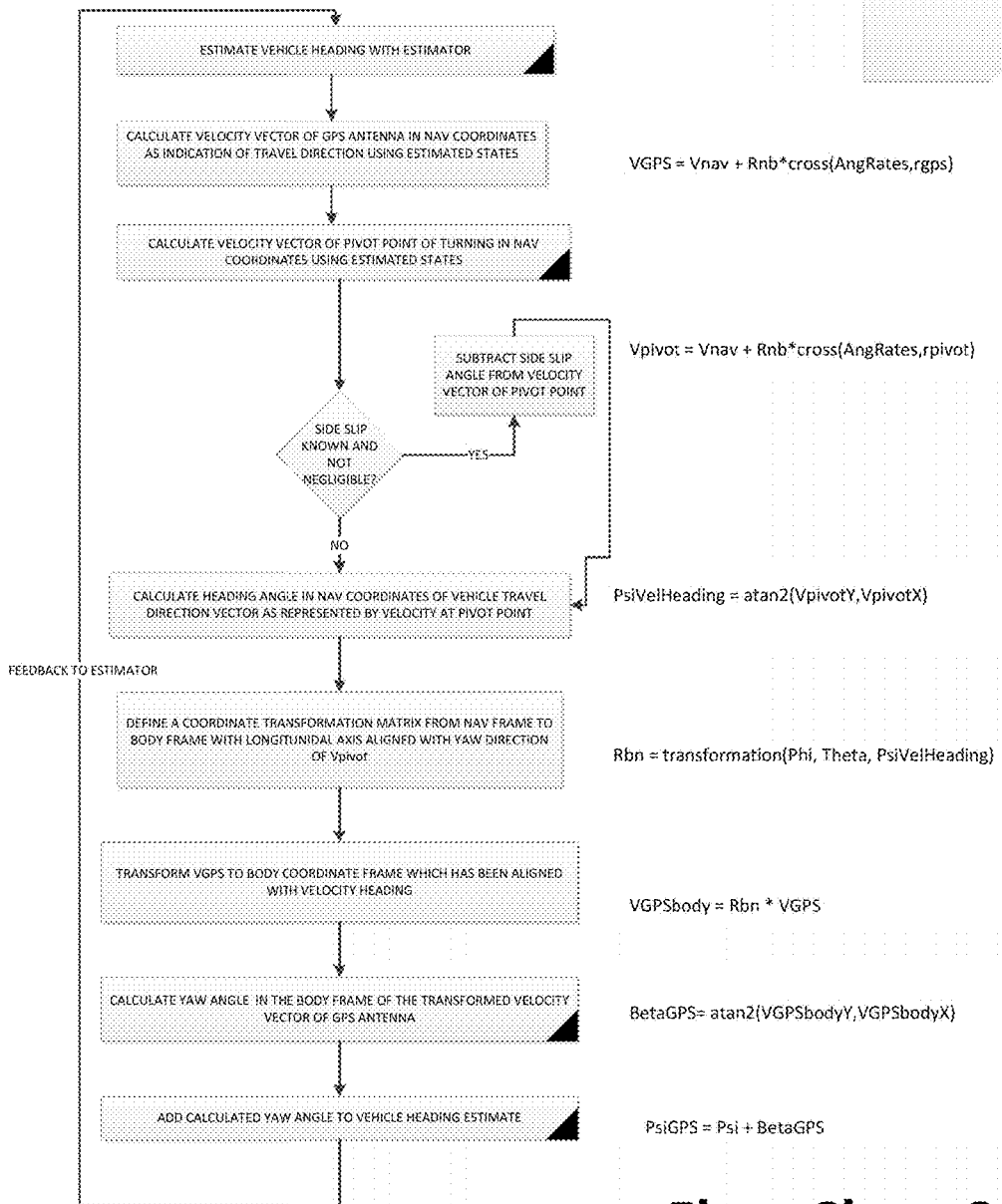

FIG. 7 (Flow Chart 2) is a flow chart of another method of calculating BetaGNSS according to a Third Exemplary Embodiment of the Invention, further described below.

A. BACKGROUND INFORMATION

U.S. Pat. No. 7,225,060 gives background information regarding an integrated GNSS and INS navigation system, incorporated by reference herein.

U.S. Published Patent Application US2014/0324291 A1 gives background information regarding basics about GNSS/INS navigation systems, the use of Kalman filters, and recognized issues regarding GNSS antenna movement and mounting position, incorporated by reference herein.

IV. DETAILED DESCRIPTION OF EXEMPLARY EMBODIMENTS

A. Overview

For a better understanding of the invention summarized above, specific examples will now be described in detail. It is to be understood that the examples are neither inclusive nor exclusive of all forms and embodiments the invention can take.

These examples will highlight application to agricultural vehicles with automated steering. However, the invention can be applied in analogous ways to other applications.

The methods according to this example of the invention can be a part of a combination of a navigation system, guidance system, and steering control system associated with an agricultural vehicle. The navigation system would inform the guidance system which would instruct the control system to effectuate locomotion of the vehicle along a predetermined path through a field.

The components of such navigation, guidance, and steering control systems are commercially available from a variety of sources. Examples are guidance and steering products from the owner of the present applications, Ag Leader Inc., Ames, Iowa 50010 USA, including brands SteerCommand® and OnTrac3™. Details regarding how the systems interconnect and interact, as well as the ability to program digital processors associated with them, are also well known to those skilled in the art. U.S. Pat. No. 7,225,060, incorporated by reference herein, discusses automated tractor steering, including calibration.

The embodiments can be implemented in typical navigation systems that include a digital processor with a digital filter, such as a Kalman filter or analogous. This is well-known in the art. Further details as background information can be seen at U.S. Published Patent Application 2014/0324291 A1, incorporated by reference herein.

B. Embodiments

The several embodiments below show ways to compensate heading estimation using GNSS/INS measurements according to aspects of the invention.

Embodiment 1 provides the method with illustrations of methodology according to the invention. In Embodiment 1, the problem and the challenge in state estimation in a GNSS/INS integrated system with a single GNSS receiver is explained. Then, apart from the development of the method, the mathematical derivation of the development of the method is provided. The representative velocity vectors for the method, at the pivot point, the GNSS receiver, and at the control point are illustrated on a front wheel steered vehicle. Moreover, the angles used in the method are illustrated in the figures and in the equations. At the end of the embodiment, the formula and the brief explanation of the implementation of the method are provided. Even though the angles are represented in the Navigation and the Body-fixed frames, their representations can be obtained at any selected reference frames, i.e., their representations are not limited to the used reference frames.

Embodiment 2 details the implementation of the invention when the correction angle, BetaGNSS, is derived from travel directions represented in the navigation frame. In Embodiment 2, approximation of vehicle heading called velocity heading (which is represented by calculated velocity at the pivot point of vehicle turning from the navigation system estimator, relative to navigation frame coordinates) and calculated velocity of the GNSS antenna relative to navigation frame coordinates (also calculated from the navigation system estimator to derive a yaw angle between the two), is added to the vehicle heading estimate to predict the GNSS heading measurement. The error in the prediction is fed back to the estimator to correct its vehicle heading estimate. Optionally, if known, vehicle side slip can be included in the calculation to predict the GNSS heading measurement. If considered negligible, it is ignored. See also the flow chart of FIG. 6 (Flow Chart 1).

Embodiment 3 details the implementation of the invention when the correction angle, BetaGNSS, is derived from travel directions represented in the body-fixed frame. Embodiment 3 is similar to embodiment 2 but transforms the velocity vector of the GNSS antenna to the body coordinate frame that has been aligned with the velocity heading, and adds the yaw angle of the transformed GNSS velocity vector to the vehicle heading estimate to predict the GNSS heading measurement. The error in the prediction is fed back to the estimator to correct its vehicle heading estimate. Optionally, if known, vehicle side slip can be included in the calculation to predict the GNSS heading measurement. If considered negligible, it is ignored. See also the flow chart of FIG. 7 (Flow Chart 2).

1. Embodiment 1

Improved Estimation Method with a Single GNSS Receiver GNSS/INS System

Problem/Need Addressed

Typically, the GNSS antenna is mounted on the vehicle roof or at another location that is high on the vehicle, so that the vehicle itself does not interfere with the reception of signals from GNSS satellites. Because of the high mounting position of the GNSS antenna, roll and pitch motions of the vehicle result in significant lateral and longitudinal travel of the GNSS antenna which leads to error in the heading measurement.

Another source of heading measurement error occurs during turning if the GNSS antenna is not mounted at the pivot point of the vehicle. The pivot point is the point on the vehicle where, for geometric turning, the travel direction is aligned with the vehicle heading. For example, on a front wheel steered tractor, the pivot point is located at the center of the rear axle. When the GNSS antenna is mounted forward, rearward, or laterally offset from the pivot point, as is typical, it will experience motion as the vehicle turns that is not aligned with the vehicle heading and this motion leads to error in the heading measurement.

A method is needed to compensate for the errors in GNSS travel based heading measurements that occur due to the roll, pitch, and turning motions of the vehicle.

This invention produces a more accurate heading measurement. The improved accuracy of the heading measurement will improve the accuracy of the navigation system and improve steering control.

Solution

The implemented method here provides significantly more accurate state estimation in GNSS/INS integrated system with a single GNSS receiver by estimating GNSS antenna's movement on the vehicle. Although when a single GNSS unit is exercised sufficiently during ground vehicle operations, the system (estimation of the positions, velocities, and orientation angles) is observable, sufficient movement of GNSS unit for full observability is not guaranteed. Therefore, it is needed to have a heading measurement, in addition to position and velocity measurements, from GNSS information. As GNSS heading measurement is calculated from GNSS velocity vector, it is nothing but ground track heading, i.e., course (or direction of the GNSS antenna). However, the estimation system (e.g., Kalman filter) needs heading angle measurement, which is the angle between the navigation frame x-axis and the body-fixed frame x-axis, the nose of the vehicle (see FIG. 1) or, the estimation system needs to predict the GNSS receiver's course by modeling/estimating the GNSS movement on the vehicle. Here, we use the condition (assumption) that in the presence of zero side-slip at the pivot point of the vehicle, the course (travel direction) of the pivot point aligns with the vehicle heading to find the velocity heading of the GNSS with respect to the vehicle, nose of the vehicle. Therefore, GNSS receiver heading can be approximated better by including the angle $\beta_{GP}$, depicted as BetaGNSS, which is found by using the velocity vectors at pivot point and the GNSS receiver point. The term or modifier "GPS" is sometimes used interchangeably with "GNSS" or vice versa, likewise for "antenna" and "receiver". Also, unless otherwise stated, it is assumed that the control point is located at the vehicle's pivot point. If the control point is desired to be selected at a different point on the vehicle, the pivot point of the vehicle is used.

| Nomenclature | |
|---|---|
| A | Center of the rear axle, |
| $\beta_A$ | Side slip angle at the rear axle center point, (the angle between $x_b$ and $\vec{V}_A$), |
| $\beta_C$ | Side slip angle at the control point, (the angle between $x_b$ and $\vec{V}_C$), |
| $\beta_G$ | Side slip angle at the GPS point, (the angle between $x_b$ and $\vec{V}_G$), |
| $\beta_{GP}$ | Approximated side slip angle at the GPS point (the angle between $\vec{V}_P$ and $\vec{V}_G$) |
| $\beta_P$ | Side slip angle at the pivot point, (the angle between $x_b$ and $\vec{V}_P$), |
| C | Control point, |
| P | Pivot point, |
| δ | Steering angle, |
| $F_{x_b y_b z_b}$ | The Body-fixed frame, |
| $F_{x_N y_N z_N}$ | The Navigation frame, |
| GPS | Global positioning system, |
| IMU | Inertial measurement unit, |
| m | Any point on the vehicle, |
| Ψ | Vehicle heading angle, |
| $\Psi_C$ | Course (velocity heading angle) of the control point, |
| $\Psi_G$ | Course (velocity heading angle) of the GPS point, |
| $\Psi_P$ | Course (velocity heading angle) of the pivot point, |

-continued

| Nomenclature | |
|---|---|
| $\vec{V}_A$ | Velocity at the point A, |
| $\vec{V}_C$ | Velocity at the point C, |
| $\vec{V}_P$ | Velocity at the point P, |
| $\vec{V}_m$ | Velocity at the point m, |
| $\vec{r}_m$ | Vector from vehicle frame to a chosen control point on the vehicle, |
| $\vec{r}_C$ | Vector from vehicle frame to the control point on the vehicle, |
| $\vec{r}_P$ | Vector from vehicle frame to the pivot point on the vehicle, |
| $\vec{\omega}$ | Angular rate of the body-fixed frame, |

Method

A digital estimator, such as a Kalman filter in conjunction with GNSS unit (GNSS/INS system) can be used to estimate the position, velocity, and attitude of a ground vehicle so that the steering control systems can be applied. The estimator periodically produces (predicts) vehicle positions, velocities, and attitude angles (roll, pitch, and yaw), some of which are compared to GNSS measurements to correct all state predictions. Typically, these GNSS measurements are positions, velocities, and heading angle.

Measurements, provided by a single GNSS, are positions (x, y, and z coordinates), velocities ($V_x$, $V_y$, and $V_z$), and course of the GNSS, $\Psi_G$. Heading angle of the vehicle is the angle between $x_N$ of the navigation frame and $x_b$ of the body fixed frame, which is attached to the vehicle. In general, we do not have the vehicle heading measurement from a single GPS or GNSS antenna or receiver due to various reasons, some of which are angular motion of the vehicle and the placement of the GPS or GNSS antenna or receiver on the vehicle. GPS or GNSS heading is nothing but the course of the GNSS antenna receiver, see FIG. 1. It gives the travel direction of the GPS or GNSS antenna or receiver (velocity vector).

In other words, GPS or GNSS heading is the angle between $x_N$ and GPS or GNSS antenna or receiver velocity vector. When certain conditions are satisfied, GPS or GNSS heading can be used as the vehicle heading measurement. For instance, for a front wheel-steered ground vehicle, assume that center of the rear axle (which can be assumed on the ground) is the pivot point and there is no side-slip angle present ($V_b{}^y$?=0 i.e., $\beta_A$=0 see FIG. 5). Also, assume that changes in roll and pitch angles are negligible small that only velocity sensed by GNSS (located at the top of the rear axle center) is forward movement of the vehicle. In this case, GNSS heading can be used as the vehicle heading measurement. If GNSS receiver is located anywhere other than top of the rear axle center, GPS or GNSS heading gives us the velocity vector of the located point, course. Particularly, owing to rolling terrain conditions and various GNSS placement possibilities on the vehicle, GNSS does not always provide the vehicle heading, needed as a measurement. Therefore, prediction of the GNSS heading measurement is not simply equal to the vehicle heading. Here we show that it is possible to compensate the error in GNSS heading measurement prediction by using an assumption, very reasonable for many ground vehicles, that course of the pivot point aligns with body-fixed frame x-axis, $x_b$. This is true as long as side-slip angle at pivot point is negligibly small. Here, note that the control point is selected at the pivot point.

With observability analysis, it can be shown that when a single GNSS unit is exercised sufficiently, full state vector (3 positions, 3 velocities, 3 Euler angles, and possibly added 6 biases for gyros and accelerometers) is observable. In cases, where GNSS is not exercised sufficiently, rank of observability matrix occasionally drops by one degree. Therefore, a bounded non-zero error (offset) appears, particularly in heading estimation, $\Psi$. On the other side, the estimation of the other states remains in very acceptable region. Specifically, the course of the pivot point (where the control is selected), $\Psi_P$, stays very accurate. We calculate the side-slip angle at GNSS receiver location as $\beta_G - \beta_P = \Psi_G - \Psi_P$. This allows us to predict the GPS or GNSS heading measurement (course) more accurately.

To explain the method mathematically, prediction of the GNSS heading measurement is formulated as the prediction of the vehicle heading ($\Psi$) and the approximate GNSS side-slip angle ($\Phi_{GP}$). In other words, the predicted heading measurement is equal to $\Psi + \beta_{GP}$, where $\beta_{GP} = \Psi_G - \Psi_P$ or $\beta_G - \beta_P$.

Figure 2:
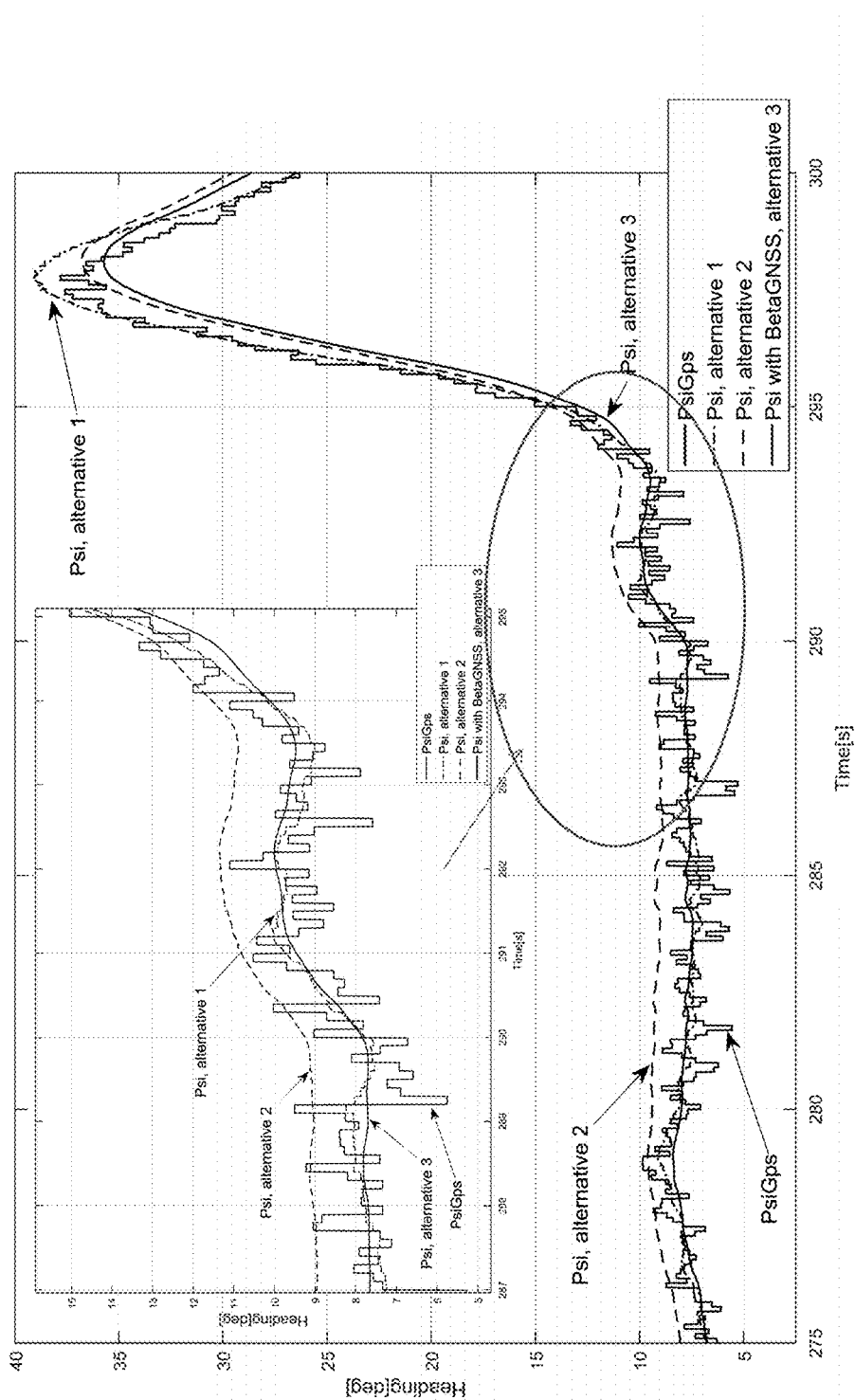
FIG. 2 is a graph illustrating principles regarding the methodology of aspects of the invention.
Figure 3:
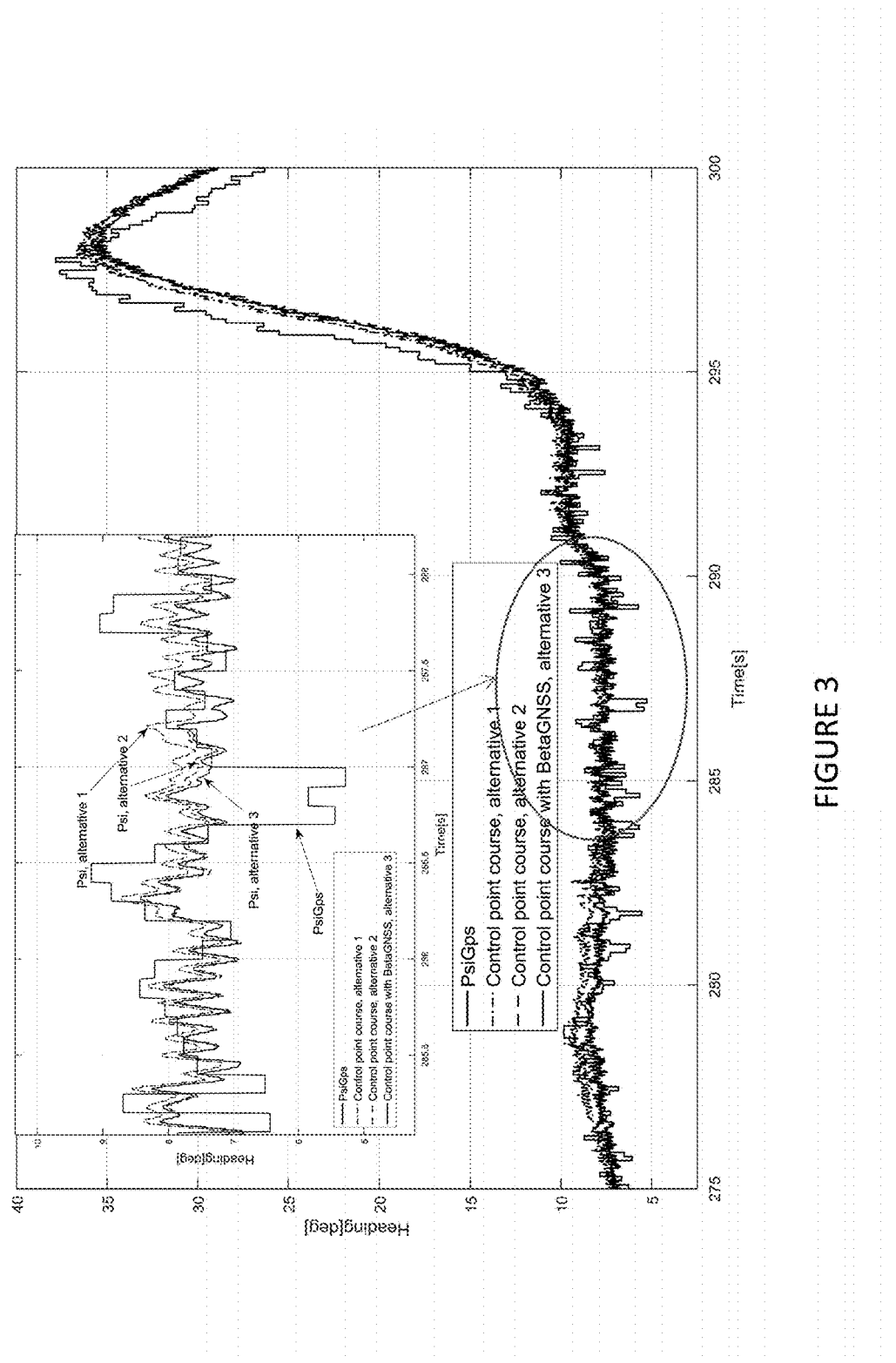
FIG. 3 is a graph illustrating principles regarding aspects of the invention.

To understand the method thoroughly, we can consider the alternative GNSS heading prediction equations. The first alternative uses the vehicle heading, $\Psi$, very common in practice. In this case, the system turns out to be observable. However, particularly due to roll motion and GNSS location away from the pivot point, state estimation accuracy degrades. This is very common at low speed and on rough terrains. The second alternative is to predict the GPS or GNSS heading measurement by $\Psi + \beta_G$. Although this seems to be a good approach in the first place, it indeed yields the system to be unobservable when GNSS receiver is not exercised sufficiently. Since, $\Psi + \beta_G$ is nothing but tan $$\tan^{-1}\left\{\frac{V_G^y}{V_G^x}\right\}^b,$$

where the velocity components are used to predict GNSS velocities. Thus, the prediction of the GNSS heading measurement is purely dependent on the velocity predictions. This shows the fact that a single GNSS receiver has maximum 6 independent measurements, positions and velocities. That is, in the second alternative, simply there is no heading measurement. The third alternative (the invention) is to use $\Psi + \beta_{GP}$ to predict GNSS heading measurement. This is based on the assumption that there exists no side-slip angle at the pivot point. In this case, the state observability is preserved. The assumption helps preserving observability and improving the estimation. FIG. 2 shows the GNSS heading measurement and vehicle heading estimation histories for a selected time period from test results with the alternatives mentioned above. This test was performed on a front wheel steered vehicle at around 5 mph. In this test, the GNSS unit is located at front roof of the cabin; therefore, the GPS or GNSS antenna or receiver is around 1.2 meter ahead of the pivot point in Body-fixed frame x axis. Thus, during left or right turns, GNSS heading measurement yields higher heading measurements due to angular motion of the vehicle. A portion of the heading history is plotted here for comparison and evaluation. The whole test was driving around an entire building.

Figure 4:
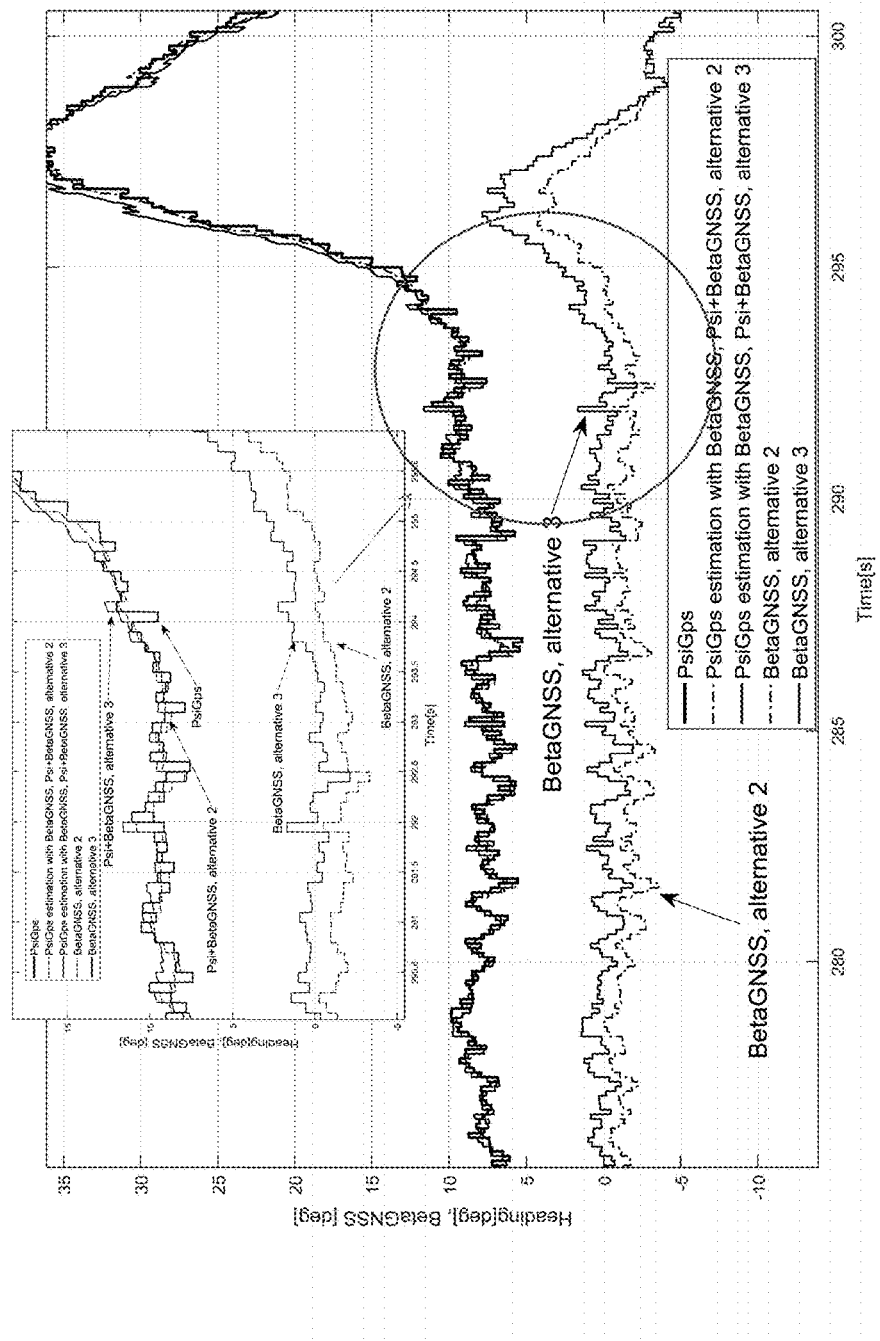
FIG. 4 is a graph illustrating principles regarding aspects of the invention.

In the figures, Psi represents the estimated vehicle heading for the corresponding alternative. PsiGps is the GNSS or GPS heading measurement. As seen in FIG. 2, the alternatives 2 and 3 have smoother and more accurate heading estimates than the first one, as expected. Since the first alternative uses the GNSS heading measurement as it is, it is prone to following heading measurement, which yields noisy and incorrect heading estimate. Comparison of the alternatives 2 and 3, particularly during time from 275th second to 290th second, shows that the second alternative has an offset in heading since the path is quite straight and mean of the heading estimate is supposed to be close to the GNSS heading measurement. This can also be seen in FIG. 4, where the second alternative has an offset in BetaGNSS estimation. FIG. 4 illustrates the prediction of the GNSS heading measurement with the second and third alternatives and the GNSS heading measurement. Even though the second alternative predicts the GNSS heading measurement more accurately, it is not as successful as the third alternative at predicting Psi and BetaGNSS individually, particularly on straight lines. This shows that the estimation is not fully observable with the second alternative. On the other side, the third alternative estimates the heading smoothly while keeping the system observable. Even though the observability of the vehicle heading is not guaranteed with the second alternative and there exists an offset in the vehicle heading estimation, the course of the pivot point still aligns with the GNSS heading measurement during straight line (the time period of 280-295 sec), which leads us to the assumption, made in the alternative 3 (see FIG. 1), when no (or negligibly small) side slip is present, BetaGNSS can be approximated as the angle between the GNSS and pivot (control) point courses.

One can claim that the similar solution can be obtained by filtering the GNSS signal but this is not a straightforward or an easy approach. Since, frequency of the change in heading measurement due to yaw, roll, and pitch motions are close to nominal operational (e.g., pivot turn and curve pattern) heading angle change frequencies. Thus, incorrect heading measurement filtering could easily deduce more error rather than correction in estimation.

Side-slip angles calculated by using the corresponding velocity components are given as follows:

$$\beta_A = \tan^{-1}\left\{\frac{V_A^y}{V_A^x}\right\}^b$$

$$\beta_C = \tan^{-1}\left\{\frac{V_C^y}{V_C^x}\right\}^b$$

$$\beta_P = \tan^{-1}\left\{\frac{V_P^y}{V_P^x}\right\}^b$$

$$\beta_G = \tan^{-1}\left\{\frac{V_G^y}{V_G^x}\right\}^b$$

BetaGNSS: $\beta_{GP} = \beta_G - \beta_P = \Psi_G - \Psi_P$

Where, superscript "b" denotes the resolution of the frame as body-fixed frame. Velocity vector on the vehicle other than the pivot point, where the Body-fixed frame is located as seen in FIG. 5, is calculated by adding the cross product of angular velocity of the vehicle and distance vector. For example, as seen in the figure, velocity at a point m is calculated as follows: $\vec{V}_m = \vec{V}_A + \vec{\omega} \times \vec{r}_m$. Similarly, the velocities at control, pivot, and GNSS points are calculated as follows:

$$\vec{V}_C = \vec{V}_A + \vec{\omega} \times \vec{r}_C$$

$$\vec{V}_P = \vec{V}_A + \vec{\omega} \times \vec{r}_P$$

$$\vec{V}_G = \vec{V}_A + \vec{\omega} \times \vec{r}_G$$

Implementation

The implementation of the method takes part in the estimation algorithm. The heading measurement equation needs to be updated with respect to the new relation, $\Psi+\beta_{GP}$. If extended KF is used, the corresponding partial derivatives (the Jacobian matrix) need to be updated, correspondingly. To avoid division by zero, a minimum velocity threshold needs to be set. This could be selected based on the operation speed range. The calculation of the $\beta_{GP}$ can be performed via the corresponding equations given in the previous section. The transformation of velocities between reference frames (The Body-fixed frame and Navigation frame, possibly other frames being used) are carried out via the transformation matrix, comprised of Euler angles.

2. Embodiment 2

This example corrects for the error in the GNSS based heading measurement by correcting for the difference between the travel direction of the GNSS antenna and the heading of the vehicle. The equations refer to this correction as BetaGNSS.

An estimator, such as a Kalman filter, will typically use its estimated states to predict the values of incoming measurements. It will then calculate the difference between the predicted measurements and the actual measurements, multiply the prediction errors by appropriate gains, and feed them back to correct the estimated states.

Consistent with this approach, this invention predicts the travel direction measurement at the GNSS antenna by doing the following:
1. Use the estimated states to calculate the velocity vector at the pivot point of vehicle turning as an approximation of the heading of the vehicle in navigation coordinates.
2. Use the estimated states to calculate the velocity vector of the GNSS antenna as an indication of its travel direction.
3. Calculate the yaw angle between the velocity vector at the pivot point of vehicle turning, the velocity heading, and the velocity vector of the GNSS antenna, and add this angle to the vehicle heading estimate produced by the estimator.

The result is an accurate prediction of the heading measurement obtained from the motion of the GNSS antenna that can be used by the estimator to provide an effective correction to the heading estimate of the estimator.

An important step in this method is the calculation of an accurate representation of the heading of the vehicle. In the absence of side slip, the direction of the velocity of the vehicle at the pivot point of vehicle turning provides a good representation of the heading of the vehicle. The pivot point of vehicle turning is the point on the vehicle where, for geometric turning, the travel direction is aligned with the vehicle heading. For example, on a front wheel steered tractor, the pivot point of vehicle turning is located at the center of the rear axle.

In the case when side slip cannot be neglected, the direction of the velocity vector at the pivot point, the velocity heading, would deviate from the vehicle heading by the side slip angle. Therefore, if the side slip angle is known, the side slip angle would be subtracted from the direction indicated by the velocity heading to approximate the heading of the vehicle.

Assuming that we have Vnav, a vector representing the velocity in navigation coordinates at the origin of the body coordinate system, Rnb, a matrix that converts a vector from body to navigation coordinates, AngRates, a vector representing the angular rates of the vehicle in the body coordinate system, a vector rGNSS, representing the position of the GNSS antenna relative to the origin of the body coordinate system, a vector rpivot, representing the position of the pivot point of the vehicle relative to the origin of the body coordinate system, and Psi, the vehicle heading estimate produced by the estimator.

The following is an example of how this calculation might be done:

a) Calculate the velocity of the pivot point of the vehicle in the navigation coordinate frame $V\text{pivot}=V\text{nav}+Rnb*\text{cross}(\text{AngRates},r\text{pivot})$ b) Calculate the velocity at the GNSS antenna in the navigation coordinate frame $V\text{GNSS}=V\text{nav}+Rnb*\text{cross}(\text{AngRates},r\text{GNSS})$ c) Calculate the angular difference between the velocity at the GNSS antenna and the velocity at the vehicle pivot point $\text{BetaGNSS}=a\tan 2(V\text{GNSS}Y,V\text{GNSS}X)-a\tan 2(V\text{pivot}Y,V\text{pivot}X)$ d) Predict the heading measurement from travel direction at the GNSS antenna using the vehicle heading estimate and the angular difference between the two velocity vectors $\text{PsiGNSS}=\text{Psi}+\text{BetaGNSS}$ Solution According to Aspects of the Invention This idea improves the accuracy of the heading measurement needed for Kalman filter estimation of vehicle position, velocity, attitude, and heading. As a result, these estimates are more accurate and more robust, and steering control is more accurate, in circumstances in which high pitch and roll dynamics are significant compared to vehicle travel velocity, and without concern for GNSS mounting location. This invention also corrects for the heading measurement error caused by lateral motion of the GNSS antenna caused by turning on an articulated vehicle.

3. Embodiment 3

Consistent with this approach, this example predicts the heading measurement based on the travel direction of the GNSS antenna by doing the following:
1. Use the estimated states to calculate the velocity vector at the GNSS antenna to indicate travel direction of the GNSS antenna in navigation coordinates.
2. Use the estimated states to calculate the direction of the velocity vector at the pivot point of vehicle turning, the velocity heading, as an accurate representation of the heading of the vehicle in navigation coordinates.
3. Define a coordinate transformation matrix to transform a vector from the navigation frame to body frame which has been rotated in yaw so that its forward pointing axis is aligned with the velocity heading obtained from step 2.
4. Transform the velocity vector of the GNSS antenna, obtained from step 1, to the body coordinate frame that has been aligned with the velocity heading, as defined in step 3.
5. Add the yaw angle of the transformed GNSS velocity vector in the body frame of step 3 to the vehicle heading estimate produced by the estimator.

The result is an accurate prediction of the heading measurement obtained from the motion of the GNSS antenna that can be used by the estimator to provide an effective correction to the heading estimate of the estimator.

An important step in this method is the calculation of an accurate representation of the heading of the vehicle. In the absence of side slip, the direction of the velocity of the vehicle at the pivot point of vehicle turning, the velocity heading, provides a good representation of the heading of the vehicle. The pivot point of vehicle turning is the point on the vehicle where, for geometric turning, the travel direction is aligned with the vehicle heading. For example, on a front wheel steered tractor, the pivot point of vehicle turning is located at the center of the rear axle.

In the case when side slip cannot be neglected, the direction of the velocity vector at the pivot point of turning would deviate from the vehicle heading by the side slip angle. Therefore, if the side slip angle is known, the side slip angle would be subtracted from the velocity heading, the direction indicated by the velocity vector at the pivot point of turning, to represent the heading of the vehicle.

Assuming that we have Vnav, a vector in navigation coordinates representing the velocity at the origin of the vehicle body coordinate system, Rnb, a matrix that converts a vector from body to navigation coordinates, Rbn, a matrix that converts a vector from navigation coordinates to the body coordinate frame aligned with the velocity heading, AngRates, a vector representing the angular rates of the vehicle in the body coordinate frame, a vector rGNSS, representing the position of the GNSS antenna in the body coordinate frame, a vector rpivot, representing the position of the pivot point of vehicle turning in the body coordinate frame, Psi, the vehicle heading estimate in the navigation frame determined by the estimator, and Phi and Theta, the vehicle roll and pitch angle estimates respectively, in the navigation frame, that were determined by the estimator.

The following is an example of how this calculation might be done:

a) Calculate the velocity vector at the GNSS antenna in the navigation coordinate frame VGNSS=Vnav+Rnb*cross(AngRates,rGNSS)

b) Calculate the velocity vector of the pivot point of vehicle turning in the navigation coordinate frame Vpivot=Vnav+Rnb*cross(AngRates,rpivot)

c) Calculate the velocity heading angle in navigation coordinates of the vehicle travel direction vector represented by the velocity at the pivot point of vehicle turning PsiVelHeading=a tan 2(VpivotY,VpivotX)

d) Define a coordinate transformation matrix from the navigation frame to a body frame with the forward pointing axis aligned in the yaw direction with the velocity heading, PsiVelHeading Rbn=transformation(Phi,Theta,PsiVelHeading)

The calculation of a coordinate transformation matrix is well known to those who are skilled in the art. The angles Phi, Theta, and PsiVelHeading are Euler angles that define the orientation of the body frame aligned with PsiVelHeading noted above with respect to the navigation frame.

e) Transform VGNSS to the body coordinate frame that has been aligned with the velocity heading VGNSSbody=Rbn*VGNSS f) Calculate the yaw angle of the transformed GNSS velocity vector in the body frame aligned with PsiVelHeading BetaGNSS=a tan 2(VGNSSbodyY,VGNSSbodyX)

g) Predict the vehicle heading measurement at the GNSS antenna as the sum of the vehicle heading estimate, Psi, and the yaw angle in the body frame aligned with the velocity heading of the transformed GNSS velocity vector PsiGNSS=Psi+BetaGNSS

C. Options and Alternatives

It will be appreciated that the invention can take various forms and embodiments. Variations obvious to those skilled in this technical field will be included within the invention, which is not limited by the specific embodiments and examples discussed above.

For example, several specific proof of concept illustrations are shown above. The invention can be applied in analogous ways to other configurations.

Furthermore, the examples are intended to show application of the invention. A designer can utilize these teachings to apply the invention to particular situations.

As is understood by those skilled in this technical field, the issues addressed apply to components of a GNSS (sometimes also called GPS) which must be mounted on a vehicle and receive wireless signals used to produce a GNSS (or GPS) solution. This component is primarily referred to herein as the GNSS antenna, but alternatively sometimes called a GNSS receiver.

What is claimed is:

1. A method of heading measurement compensation with a vehicle having a pivot point of vehicle turning for GNSS navigation using a GNSS antenna and an estimator which produces estimated states used in a navigation solution comprising:
    a. using the estimated states to calculate a velocity vector at the pivot point of vehicle turning as an approximation of the heading of the vehicle, called the velocity heading;
    b. using the estimated states to calculate a velocity vector of the GNSS antenna as an indication of its travel direction;
    c. calculating an angle between the velocity vector at the pivot point of turning and the velocity vector of the GNSS antenna, and
    d. adding this angle to a vehicle heading estimate produced by the estimator to predict the heading measurement determined by changes in GNSS antenna position.

2. The method of claim 1 wherein the difference between the GNSS heading measurement of a single GNSS antenna and the prediction of the measurement is used to correct one or more estimated states.

3. The method of claim 1 wherein pivot point side slip is ignored or considered negligible.

4. The method of claim 1 wherein pivot point side slip angle is considered and subtracted from the angular direction of the pivot point velocity vector.

5. The method of claim 1 wherein the GNSS antenna and estimator are a part of a GNSS/INS integrated navigation system.

6. The method of claim 1 further comprising generating navigation solutions from a GNSS/INS integrated navigation system comprising:

a. obtaining GNSS position, velocity, and heading angle measurements from the GNSS;
b. obtaining a vehicle side-slip angle;
c. translating the GNSS heading angle measurement to the vehicle body-fixed frame; and
d. compensating a vehicle body-fixed frame heading estimate with the derived vehicle side-slip angle $\beta_{GP}$.

7. The method of claim 6 further comprising a control point with control frame.

8. The method of claim 6 further comprising a navigation frame separate from the GNSS frame and the vehicle frame, and the vehicle frame heading estimation is derived from $\Psi+\beta_{GC}$ where $\Psi$ is vehicle heading relative the navigation frame and $\beta_{GC}$ is derived vehicle side-slip angle.

9. The method of claim 8 wherein:
a. $\Psi$ comprises a heading estimation from the GNSS/INS integrated navigation system; and
b. $\beta_{GC}$ comprises:
    i. actual GNSS slip-angle if the control frame and vehicle frame are assumed to share an origin;
    ii. actual vehicle slip-angle minus a control point compensation angle if the control frame does not share an origin with the vehicle frame.

10. The method of claim 9 wherein the GNSS slip-angle is calculated by $\beta_G \approx \beta_{GC} = \beta_G - \beta_C$ where $\beta_G$ comprises the vehicle slip angle and $\beta_C$ comprises the control point angular offset from the vehicle heading estimation.

11. The method of claim 1 further comprising applying the navigation solution to an automated steering system of an agricultural vehicle.

12. A method of heading measurement compensation with a vehicle having a pivot point of turning and GNSS navigation using a GNSS antenna and an estimator which produces estimated states used in a navigation solution comprising:
a. using the estimated states to calculate the velocity vector at the GNSS antenna to indicate travel direction of the GNSS antenna in navigation coordinates;
b. using the estimated states to calculate the velocity vector at the pivot point of vehicle turning as a representation of the heading of the vehicle;
c. defining a coordinate transformation to transform a vector from the navigation frame to a body frame which is aligned with the heading of the vehicle obtained from step b;
d. transforming the velocity vector of the GNSS antenna, obtained from step a, to the body coordinate frame that has been aligned with the vehicle heading, as defined in step c; and
e. adding an angle of the transformed GNSS velocity vector in the body frame of step c to a vehicle heading estimate produced by the estimator to predict the heading measurement determined by changes in GNSS position.

13. The method of claim 12 wherein pivot point side slip is ignored or considered negligible.

14. The method of claim 12 wherein pivot point side slip is considered and subtracted from the pivot point velocity vector.

15. The method of claim 12 wherein the GNSS antenna and estimator are a part of a GNSS/INS integrated navigation system.

16. The method of claim 12 further comprising applying the navigation solution to an automated steering system of an agricultural vehicle.

17. The method of claim 12 wherein the transforming step:
a. defining a coordinate transformation to transform a vector from the navigation frame to the body frame which is aligned with the velocity heading of the vehicle;
b. transforming the velocity vector of the GNSS antenna to the body coordinate frame; and
c. adding the angle of the GNSS velocity vector in the body frame aligned with the velocity heading to a vehicle heading estimate produced by the estimator.

18. A GNSS/INS integrated navigation system comprising:
a. a GNSS subsystem including a GNSS antenna associated with a GNSS frame;
b. an INS sub-system;
c. a digital estimator for predicted estimated states for the integrated system comprising
    i. a processor programmed to perform the method of claim 1 and output a navigation solution including the compensated heading estimation.

19. A vehicle guidance and control system comprising:
a. a GNSS/INS navigation system comprising:
    i. a GNSS subsystem including a GNSS antenna associated with a GNSS frame;
    ii. an IMU sub-system;
    iii. a processor programmed to perform the method of claim 1 and output a navigation solution including the compensated heading estimation;
b. a guidance system in operative communication with the output of the navigation system to use the compensated navigation solution for vehicle guidance;
c. a control system in operative communication with the guidance system to effect vehicle guidance to the vehicle.

20. The system of claim 19 used on an agricultural vehicle.

21. The system of claim 20 wherein the agricultural vehicle is a front-steerable vehicle with the pivot point at the center of the rear axle.

22. The system of claim 20 wherein the agricultural vehicle is an articulated vehicle with a pivot point of vehicle turning at the center of the front axle.

23. A method to estimate vehicle position, orientation, velocity, and angular velocity more accurately in an integrated GNSS/INS system by using a single GNSS receiver comprising:
a. using the estimated states to calculate a velocity vector at a pivot point of vehicle turning as an approximation of vehicle heading of the vehicle in navigation coordinates, the angle between a navigation frame x-axis and a body-fixed frame x-axis of the vehicle, based on an assumption that side-slip angle at the pivot point is negligibly small;
b. using the estimated states to calculate a velocity vector of the GNSS receiver, represented in the Navigation frame or in the Body-fixed frame;
c. using the estimated velocity vectors at the pivot point and a GNSS receiver point to calculate (estimate) the GNSS course $\Psi_G$ and the pivot point course $\Psi_P$ (or $\beta_G$ and $\beta_P$);
d. using $\Psi_G$ and $\Psi_P$ (or $\beta_G$ and $\beta_P$) to calculate (estimate) BetaGNSS $\beta_{GP}$, the angle between the GNSS receiver velocity vector and the pivot point velocity vector; and
e. using BetaGNSS $\beta_{GP}$ to calculate (estimate) $\Psi_G + \beta_{GP}$, a prediction of the GNSS receiver course measurement;
f. using the difference between the GNSS receiver heading measurement and its prediction, $\Psi_G + \beta_{GP}$ in an estimation algorithm.

24. The method of claim 23 applied to representation of the angles in different frames.

25. The method of claim 23 further comprising selecting the body-fixed frame at the IMU point and using separate frames for selected points.

26. The method of claim 23 wherein the difference between the GNPSS heading measurement and the prediction of the measurement is used to correct one or more estimated states.

27. The method of claim 23 wherein the GNSS antenna and estimator are a part of a GNSS/IMU integrated navigation system.

28. The method of claim 23 further comprising generating navigation solutions from a GNSS/IMU integrated navigation system comprising:
   a. obtaining GNSS position, velocity, and heading angle measurements from the GNSS;
   b. deriving a vehicle side-slip angle $\beta_{GP}$;
   c. translating the GNSS heading angle measurement to the Body-fixed frame; and
   d. compensating a vehicle heading estimation with the derived vehicle side-slip angle $\beta_{GP}$.

29. The method of claim 23 further comprising applying the navigation solution to an automated steering system of an agricultural vehicle.

30. A GPS/IMU integrated navigation system comprising:
   a. a GPS subsystem including a GPS antenna associated with a GPS frame;
   b. an IMU sub-system;
   c. a digital estimator for predicted estimated states for the integrated system comprising:
      i. a processor programmed to perform the method of either claim 23 and output a navigation solution including the compensated heading estimation.

31. A vehicle guidance and control system comprising:
   a. a GPS/IMU navigation system comprising:
      i. a GPS subsystem including a GPS antenna associated with a GPS frame;
      ii. an IMU sub-system;
      iii. a processor programmed to perform the method of either claim 23 and output a navigation solution including the compensated heading estimation;
   b. a guidance system in operative communication with the output of the navigation system to use the compensated navigation solution for vehicle guidance;
   c. a control system in operative communication with the guidance system to effect vehicle guidance to the vehicle.

32. The system of claim 23 applied to an agricultural vehicle having a pivot point which may differ from one vehicle to another, the pivot point being at:
   a. the rear axle for front wheel steered vehicles;
   b. the front axle for articulated vehicles and combines; and
   c. for others at the point where the side-slip is minimal.

33. The system of claim 23 used on ground vehicles in improving estimation.

* * * * *